United States Patent [19]

Jouvin

[11] Patent Number: 5,352,037
[45] Date of Patent: Oct. 4, 1994

[54] MIXING BOWL FOR A PLANETARY CENTRIFUGAL MIXER, AND MIXER RECEIVING SUCH BOWLS

[76] Inventor: Jean-Luc Jouvin, 42, avenue du Général-Leclerc, Le Mans, F-72000, France

[21] Appl. No.: 39,386
[22] PCT Filed: Oct. 18, 1991
[86] PCT. No.: PCT/FR91/00817
  § 371 Date: Apr. 19, 1993
  § 102(e) Date: Apr. 19, 1993
[87] PCT Pub. No.: WO92/06777
  PCT Pub. Date: Apr. 30, 1992

[30] Foreign Application Priority Data

Oct. 18, 1990 [FR] France ................. 90 12904

[51] Int. Cl.$^5$ .............................................. B01F 9/00
[52] U.S. Cl. .................................. 366/219; 366/602; 494/33
[58] Field of Search ............... 366/219, 235, 208, 209, 366/213, 214, 215, 217, 218, 602, 139, 55, 187, 288; 494/33

[56] References Cited

U.S. PATENT DOCUMENTS

| | | | |
|---|---|---|---|
| 3,778,033 | 12/1973 | Pullman | 366/219 |
| 4,586,292 | 5/1986 | Carroll | 366/219 |
| 4,728,197 | 3/1988 | Reinhard | 366/219 |

FOREIGN PATENT DOCUMENTS

| | | |
|---|---|---|
| 0207335 | 1/1987 | European Pat. Off. . |
| 2001301 | 7/1970 | Fed. Rep. of Germany . |
| 2209850 | 10/1972 | Fed. Rep. of Germany . |

Primary Examiner—Robert W. Jenkins
Attorney, Agent, or Firm—Weiser & Associates

[57] ABSTRACT

The planetary centrifugal mixer comprises a fixed axis (4) on which is rotatably mounted an arm (10) carrying a fixed rod (11) extending upwardly. The arm (10) is rotated about the axis (4) by means of a drive pinion (9), and at the same time a mixing bowl (22) fitted on the rod (11) is rotated about the rod, the drive pinion (16) of the bowl (22) being coupled by an intermediate pinion (18) to a pinion (19) integral with the fixed axis (4). The side wall (24) of the bowl (22) has at least two segments (28), the curvature radius being greater than that of the remaining segments (27). A central guide (29) projects from the bottom (23) of the bowl (22), its outer shape being matched to the shape of the lateral wall (24).

13 Claims, 2 Drawing Sheets

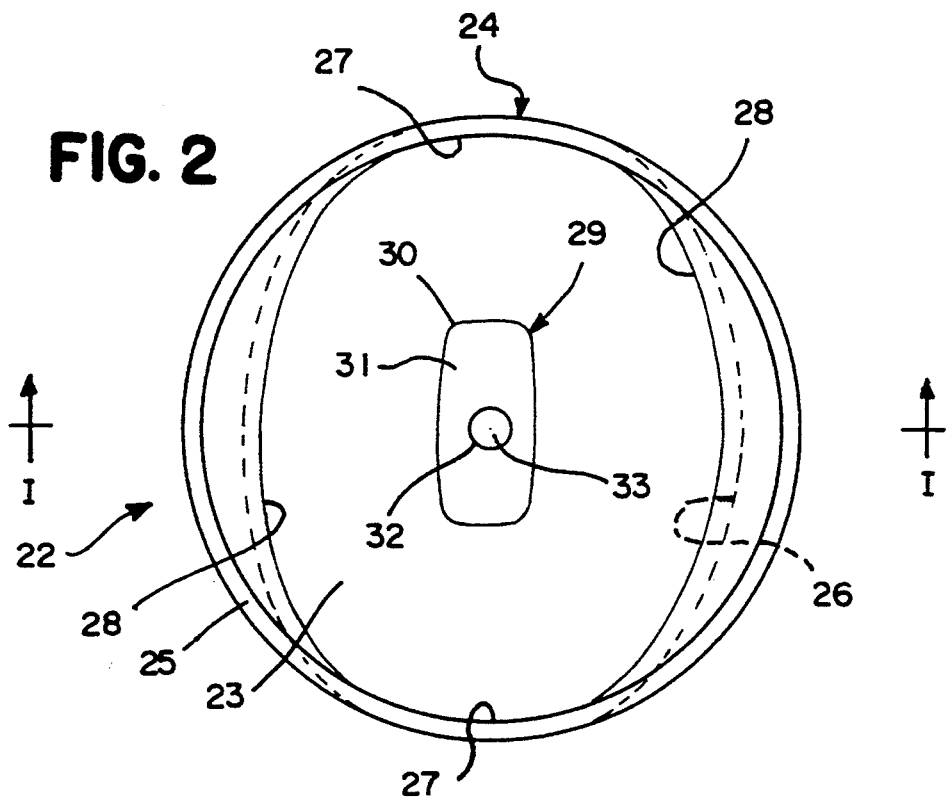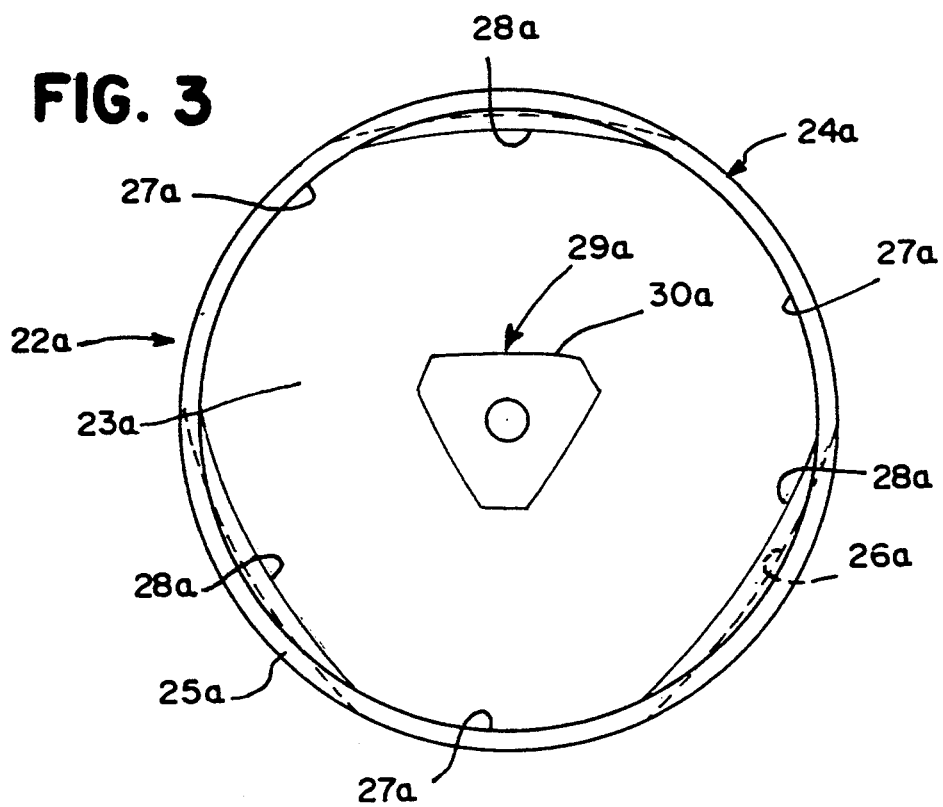

MIXING BOWL FOR A PLANETARY CENTRIFUGAL MIXER, AND MIXER RECEIVING SUCH BOWLS

The present invention relates to a mixing bowl for planetary centrifugal mixers, and to a planetary centrifugal mixer receiving such bowls.

Planetary centrifugal mixers are known, for example through Patent Application DE-A-2,209,850 and Patent Application EP-A-207,335, intended for example for the preparation of mixtures used in dentistry, particularly alginate-based pastes for taking dental impressions and comprising at least one arm mounted movable in rotation about a vertical axis, means provided on the said arm so as to permit the mounting of a bowl movable in rotation about an axis sloping with respect to the axis of rotation of the arm, and driving and planetary transmission means for simultaneously causing the arm to turn about its vertical axis of rotation and the bowl about its axis of rotation sloping with respect to the vertical. The bowls provided on these known mixers are bowls of revolution comprising a bottom and a peripheral lateral wall of cylindrical general shape. However, the mixing effect to which the products to be mixed are subjected in such bowls often proves not to be optimal, in view, among other things, of the consistency of the products to be mixed and of the effect of adherence of these products to the bowls.

In order to improve this mixing effect, it has already been proposed through Patent Application DE-A-2,001,301 to give such mixing bowls an internal shape which is not of revolution. According to FIGS. 17 and 18 of this document, the internal space of a mixing bowl of cylindrical external configuration has the shape of a transverse slit defined by two parallel flat walls and by two semi-circular end walls.

Such a bowl proves not to give satisfaction because an excessive unbalance is produced, when the bowl rotates, owing to the shape of the latter and to the irregular movement which the products to be mixed undergo in the bowl.

Moreover, another disadvantage of the known mixing bowls consists in the difficulties in extracting the mixed product from the bowl. This extraction is generally effected with the aid of a spatula which it is necessary to pass several times into the bowl so as to remove therefrom the whole of the contents.

Furthermore, the known bowls, when they are light, that is to say with a thin peripheral lateral wall, undergo during mixing deformations under the effect of the centrifugal force.

Another problem relating to the known bowls concerns the closure of these bowls with the aid of a detachable lid fitted onto or into the bowl. If this closure is hermetic, in order to protect the contents of the bowl from the ambient air, a partial vacuum (suction cup effect) is produced inside the bowl when the lid is removed. In order to remedy this suction cup effect, it has already been proposed to pierce a small hole in the lid, but in this case the bowl and its lid do not constitute a hermetic enclosure and, moreover, when the lid is removed, an air intake is produced through the hole, inducing a jet of air which results, when the products contained in the bowl are in powder form, in a portion of these products being blown out of the bowl at the moment when the lid is removed.

In a general way, the known centrifugal planetary mixers of the type defined above have moreover the disadvantage of a high cost owing to the complicated structure of the mixer as a whole and in particular of the means for supporting the rotary arm and of the means for supporting the mixing bowl on the rotary arm. In fact, these support means generally comprise a rotary shaft for the arm as well as a rotary shaft for a bowl-carrier, which involves the use of bearings (rolling bearings) for mounting these shafts. Moreover, the holding of the bowls on these mixers is often unsatisfactory.

The present invention has as its subject a mixing bowl for a planetary centrifugal mixer, this bowl ensuring an effective mixing while facilitating the removal of the mixed products from the bowl. The invention also has as its subject a mixing bowl with lid, preventing any deformation of the bowl during mixing and permitting both a hermetic closure of the bowl by the lid and a removal of the lid without partial vacuum effect and without air intake capable of causing, in the case of powdery products to be mixed, these products to be blown out of the bowl. The invention further has as its subject a mixing bowl and a planetary centrifugal mixer which are designed so that the bowl is perfectly held in position on the mixer. The invention moreover has as its subject a planetary centrifugal mixer of simpler, therefore more reliable and less costly, structure than the known mixers.

The mixing bowl according to the invention for a planetary centrifugal mixer comprises a bottom and a peripheral lateral wall of cylindrical general shape. According to the invention, the lateral wall has, at least internally, at least over the lower part of its height, in zones spaced regularly and distributed over the periphery of the bowl, at least two curved segments the radius of curvature of which is greater than the radius of curvature of the remaining zones. Moreover, the bowl comprises a central guide projecting upwards on the bottom and having a non-cylindrical external shape such that the radial distance between the internal surface of the peripheral lateral wall and the said guide is substantially the same over the entire periphery of the guide.

In the context of the invention, the said segments of the peripheral lateral wall of the bowl, the radius of curvature of which is greater than the radius of curvature of the remaining zones, may be two, three, or even four in number. The higher this number, the lower must be the speed of rotation of the bowl. However, the higher the number of these segments, the less these segments are pronounced and therefore the less effective they are.

The mixing bowl according to the invention may be fitted with a fitting lid pierced with a central hole in its head. In this case, the said lid has a depth of fitting onto or into the bowl which is greater than the thickness of its head and the central guide of the bowl projects upwards on the bottom of the bowl over such a height that it closes the hole of the lid solely when the latter is fitted home onto or into the bowl.

Thus, the central guide interacts with the hole of the lid so as to prevent any deformation of the bowl under the effect of the centrifugal force and so as to ensure a hermetic closure of the bowl when the lid is fitted home onto or into the latter. When the lid is removed, the central guide clears the hole of the lid before the latter is completely taken off, which permits a balancing of the internal pressure of the bowl before the complete removal of the lid. Thus, neither partial vacuum inside the bowl, nor an air intake capable of flowing out the powdery products to be mixed contained in the bowl, are produced.

In order to improve the holding of the bowl on the rotary arm of the mixer, the central guide of the bowl has a bore opening on the side of the bottom of the bowl, which allows the bowl to be fitted onto a rod-shaped holding member mounted on the arm. The bowl is thus held at its center, over all or part of its height, which excludes any risk of ejection of the bowl during operation, for example because of a defective fitting of the bowl onto the arm.

The planetary centrifugal mixer according to the invention intended to receive at least one bowl of the type defined above comprises at least one arm mounted movable in rotation about a vertical axis. Means are provided on the said arm for mounting the bowl movably in rotation about an axis sloping with respect to the vertical. Driving and planetary transmission means are provided moreover so as to cause the said arm and the said bowl to turn simultaneously about their respective axes of rotation. According to the invention, the means for mounting the bowl on the arm consist of a rod of circular cross-section attached rigidly to the arm, this rod being adapted to interact with the bore of the central guide of the bowl when the latter is fitted onto the said rod.

This rod, the rigid attachment of which onto the arm is very simple, ensures a much better holding of the bowl than the bowl-carriers of the known mixers which must be deep so that the bowl can be fitted thereon and, at the same time, be held and driven in rotation. The driving of the bowl in rotation on the mixer according to the invention can be performed directly by a pinion mounted coaxially with the rod in rotation on the top of the arm and presenting on its upper surface means capable of interacting, with a view to the driving, with the bottom of the bowl.

Preferably, the arm of the mixer according to the invention is mounted in rotation on a fixed spindle and bears on the lower side a pinion for its driving in rotation. The planetary transmission means for driving the bowl in rotation about its axis comprise a pinion integral with the fixed spindle of the arm, on the upper side of the arm, this pinion being coupled by an intermediate pinion mounted in rotation on the arm with the said pinion coaxial with the said rod.

Preferably, the said pinion coaxial with the rod has, on top, means having a shape complementary to the non-circular external shape of the bowl.

With reference to the accompanying diagrammatic drawings, one embodiment of a planetary mixer according to the invention, and two embodiments of bowls for such a mixer will be described below in greater detail; in the drawings:

FIGS. 2 and 3 are plan views of two variant bowls without the lids.

Figure 1:
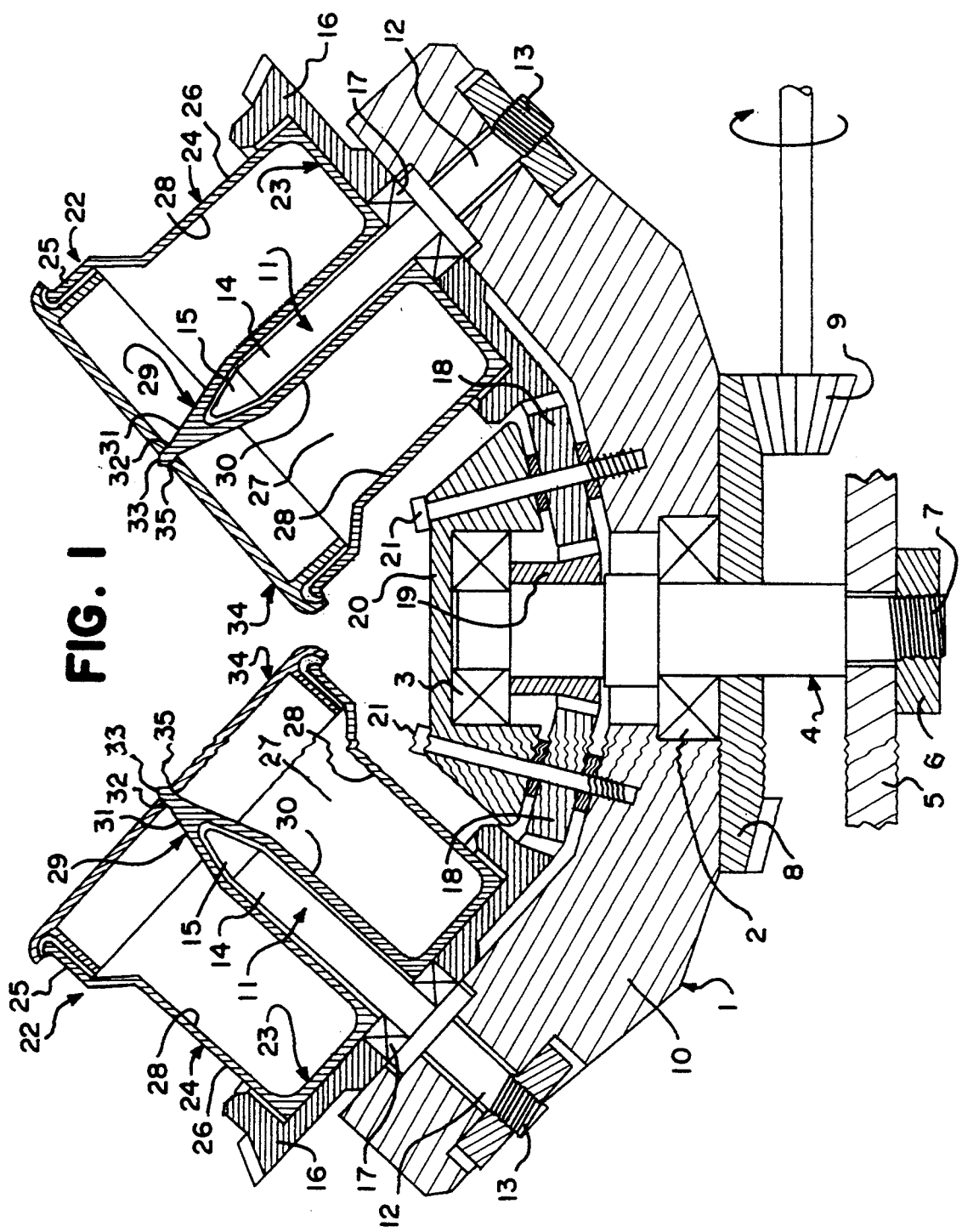
FIG. 1 is an axial cross-section of a mixer according to the invention with two bowls.

According to FIG. 1, a centrifugal planetary mixer, only the moving parts of which are shown, comprises a double arm 1, rotatably mounted by 2 rolling bearings 2 and 3 on a vertical spindle 4 attached to a support 5 with the aid of a nut 6 screwed onto the threaded lower end 7 of the spindle 4, passing through a hole of the support 5. The double arm 1 bears, on the lower side, a pinion 8 concentric with the spindle 4, this pinion 8 being operated by a pinion 9 driven by a motor which is not shown.

The double arm 1 comprises two arms 10 disposed in a same containing plane through the spindle 4. Each arm 10 bears, in the vicinity of its free end, a rod 11 rigidly attached to the arm 10. Each rod 11 comprises an attachment part 12 passing through the arm 10 and rendered integral with the latter by a nut 13, and a cylindrical mounting part 14 projecting upwardly beyond the arm 10 and terminated by a conical tip 15.

It should be noted that the axis of the rod 11 is sloping with respect to the vertical, that is to say with respect to the spindle 4, by an angle of between about 40° and 60°.

A pinion 16 is rotatably mounted by a rolling bearing 17 on the rod 11 on the upper side of each arm 10. This pinion meshes with an intermediate pinion 18 which is rotatably mounted on the arm 10 and which itself meshes with a pinion 19 integral with the upper end of the spindle 4. In the example shown, the spindle 4 and the intermediate pinions 18 are capped by a cover 20 secured by screws 21.

Each rod 11 serves to receive a mixing bowl 22 shown in FIG. 2 in plan view and in FIG. 1 in axial cross-section along line I—I of FIG. 2.

The bowl 22 comprises a substantially flat bottom 23 and a peripheral lateral wall 24 which has a cylindrical shape in its upper part 25 and a noncylindrical shape in its lower part 26. As is particularly apparent in FIG. 2, the lower part 26 of the lateral wall 24 comprises two opposing segments 27 having the same radius of curvature as the upper part 25 of the lateral wall 24, and two opposing segments 28 which, offset respectively by 90° with respect to the segments 27, have a greater radius of curvature than the segments 27.

Each bowl 22 comprises moreover a central guide 29 projecting upwards on the bottom 23 and having such an external shape that the radial distance between the internal surface of the lower part 26 of the peripheral lateral wall 24 and the said guide 29 is substantially the same over the entire periphery.

As is apparent in FIG. 1, the guide 29 retains this external shape over the entire height of the lower part 26 of the lateral wall 24 and is then extended upwards by a part 31 tapering progressively in the shape of a truncated cone about as far as the upper edge of the bowl 22. The part 31 is followed upwards by a cylindrical part 32 which is terminated by a conical tip 33.

A lid 34 fitted into the aperture of the bowl 22 has at its center a hole 35 the diameter of which is substantially equal to the diameter of the cylindrical part 32 of the guide 29. The thickness (of the head) of the lid 34 is less than the fitting depth of the lid 34.

The guide 29 has internally a bore 36 which opens on the side of the bottom 23 and the shape of which is adapted to the shape and to the diameter of the part 14 of the rod 11.

It should further be noted that the pinion 16 rotatably mounted on the rod 11 itself integral with the arm 10 comprises, on the side turned towards the bowl 22, a projecting part 37 shaped in accordance with the (non-circular) external shape which the bowl 22 has in its lower part, so that when the bowl 22 is fitted onto the part 14 of the rod 11, the lower part of the bowl 22 comes to fit into the part 37 of the pinion 16, the bowl 22 then being integral in rotation with the pinion 16.

It should further be noted that the cylindrical part 32 of the guide 29 has such a height that it closes the hole 35 of the lid 34 only when the latter is fitted home into the bowl 22. Consequently, the guide 29 clears the hole 35 of the lid 34, thus permitting a balancing of pressure between the inside of the bowl and the outside, as early as the beginning of the movement of removal of the lid 34 from the bowl 22. This therefore eliminates any partial vacuum effect opposing the removal of the lid. Moreover, because of the relatively large diameter of the hole 35, this prevents, when the lid is removed, the creation of a jet of air towards the inside of the bowl 22, and thus prevents the products contained in the bowl 22 from being blown out when the said products are in powder form.

In connection with this, it should be noted that the mixer according to the invention may find applications in all fields, but that one of its particularly advantageous applications is found in the field of dentistry, with a view to the preparation of paste, particularly alginate-based paste, for taking impressions. The use of the bowls according to the invention makes it possible to prepare in advance and to conserve in the bowls according to the invention predetermined quantities of alginate powder, the leaktight closure of these bowls preventing the alginate from being spoiled through exposure to the air. Then, for each preparation of a quantity of paste for taking impressions, it is sufficient to select the bowl containing the required quantity, to open this bowl, to add thereto a corresponding quantity of water and then to proceed to mix the paste on the mixer.

The presence on the mixer according to the invention of two arms 10 each bearing a rod 11 makes it possible to prepare simultaneously in two bowls, either a double dose of a mixture, or two different mixtures, for example of different viscosities. In the case of use of a single bowl on one arm, it is sufficient to place a balancing washer on the rod 11 of the other arm.

The bowls according to the invention make it possible in this case to use normal alginate instead of the "dust free" type alginate which must necessarily be used with the known mixing bowls in order to prevent or reduce the risks of alginate in powder form being blown out when the bowls are opened, as a result of the jet of air which is then produced because of the small-sized hole, hitherto provided in the lids of mixing bowls.

The mixing bowl 22a according to FIG. 3 differs from the mixing bowl 22 of FIG. 2 by the shape of the lower part 26a of the lateral wall 24a and by the external shape of the central guide 29a. In fact, according to FIG. 3, the part 26a of the lateral wall 24a comprises three segments 27a having the same radius of curvature as the upper part 25a of the lateral wall 24a, and three segments 28a having a greater radius of curvature, the three segments 27a and the three segments 28a being offset respectively by 120°. Here also, the central guide 29a has, in its lower part 30a, such an external shape that the distance separating the part 30a of the central guide 29a from the internal surface of the part of lateral wall 24a is substantially the same over the entire periphery, this facilitating the removal of the substances mixed in the bowl with the aid of a spatula having a width substantially corresponding to the said distance.

Another advantage of the guide 29, 29a of the bowl and of the lid 24 interacting with this guide consists in the rigidity which this gives the bowl, that is to say in the absence of deformation of the bowl during the mixing under the effect of the centrifugal force. In fact, the lid thus always ensures the centring of the peripheral lateral wall on the guide itself centred on the rod 11 of the mixer.

I claim:

1. A mixing bowl for a planetary centrifugal mixer, comprising:
    a bottom;
    a lateral wall extending from peripheral portions of the bottom and having an overall shape which is substantially cylindrical and an inner surface which, along at least lower portions of the lateral wall, includes a plurality of regularly spaced zones wherein two of the regularly spaced zones have a first radius of curvature and are separated by another two of the regularly spaced zones having a second radius of curvature greater than the first radius of curvature; and
    a central guide extending from central portions of the bottom and including an outer surface having a shape wherein radial distances between the inner surface of the lateral wall and the outer surface of the central guide are substantially the same.

2. The mixing bowl of claim 1 wherein the regularly spaced zones include three of the regularly spaced zones with the first curvature separated by three of the regularly spaced zones with the second curvature.

3. The mixing bowl of claim 1 which further includes a lid for engaging the lateral wall, for enclosing the mixing bowl, wherein the lid includes a centrally disposed aperture for engaging a tip extending from the central guide of the mixing bowl.

4. The mixing bowl of claim 3 wherein the central guide has a height above the bottom such that the aperture of the lid is enclosed by the tip of the central guide when the lid is received by the lateral wall of the mixing bowl.

5. The mixing bowl of claim 4 wherein the central guide terminates in a conical end portion including the tip of the central guide.

6. The mixing bowl of claim 5 wherein the tip is cylindrical, for engaging a round aperture of the lid.

7. The mixing bowl of claim 5 wherein the central guide includes a bore extending to the bottom of the mixing bowl.

8. The mixing bowl of claim 7 wherein the bore is cylindrical.

9. A planetary centrifugal mixer for receiving a mixing bowl;
    wherein the mixing bowl comprises a bottom, a lateral wall extending from peripheral portions of the bottom and having an overall shape which is substantially cylindrical and an inner surface which, along at least lower portions of the lateral wall, includes a plurality of regularly spaced zones wherein two of the regularly spaced zones have a first radius of curvature and are separated by another two of the regularly spaced zones having a second radius of curvature greater than the first radius of curvature, and a central guide extending from central portions of the bottom and including an outer surface having a shape wherein radial distances between the inner surface of the lateral wall and the outer surface of the central guide are substantially the same; and
    wherein the centrifugal mixer comprises an arm mounted for rotation about a substantially vertical axis, a rod connected to and extending from the arm and having a substantially circular cross-section, for receiving the central guide of the mixing bowl, wherein the central guide includes a bore for engaging the rod so that the mixing bowl is rotatable about an axis defined by the rod and disposed at an angle to the vertical axis of the arm, and planetary transmission means including driving means for causing the arm to rotate about the vertical axis while simultaneously causing the mixing bowl to rotate about the axis defined by the rod.

10. The planetary centrifugal mixer of claim 9 wherein the arm is received by a fixed vertical spindle, for rotation about the spindle, and includes a pinion for rotating the arm.

11. The planetary centrifugal mixer of claim 10 wherein the arm further includes a pinion for rotating the mixing bowl, wherein the pinion for rotating the mixing bowl is pivotally associated with the rod extending from the arm.

12. The planetary centrifugal mixer of claim 11 wherein a fixed pinion is associated with the spindle for receiving the arm, and engages an intermediate pinion pivotally associated with the arm and engaging the pinion for rotating the mixing bowl.

13. The planetary centrifugal mixer of claim 9 which includes two arms for simultaneously receiving two mixing bowls.

* * * * *